(12) United States Patent
Hesse et al.

(10) Patent No.: US 8,652,279 B2
(45) Date of Patent: Feb. 18, 2014

(54) METHOD FOR PRODUCING SANDWICH COMPONENTS AND CORRESPONDING PRESS

(75) Inventors: Karsten Hesse, Bremen (DE);
Heinz-Peter Busch, Weyhe (DE)

(73) Assignee: Airbus Operations GmbH (DE)

( * ) Notice: Subject to any disclaimer, the term of this patent is extended or adjusted under 35 U.S.C. 154(b) by 552 days.

(21) Appl. No.: 11/990,900

(22) PCT Filed: Aug. 23, 2006

(86) PCT No.: PCT/EP2006/008289
§ 371 (c)(1),
(2), (4) Date: Jun. 25, 2009

(87) PCT Pub. No.: WO2007/022971
PCT Pub. Date: Mar. 1, 2007

(65) Prior Publication Data
US 2009/0321009 A1    Dec. 31, 2009

(30) Foreign Application Priority Data
Aug. 23, 2005   (DE) .................. 10 2005 039 837

(51) Int. Cl.
*B32B 41/00*   (2006.01)

(52) U.S. Cl.
USPC ............ 156/64; 156/285; 156/286; 156/350; 156/351; 156/367; 156/378; 156/379; 156/381; 156/382; 264/40.3; 264/40.6; 264/510; 264/511; 264/519; 264/571; 264/572

(58) Field of Classification Search
USPC ........... 156/64, 285, 286, 350, 351, 367, 378, 156/379, 381, 382; 264/40.3, 40.6, 510, 264/511, 519, 571, 572
See application file for complete search history.

(56) References Cited

U.S. PATENT DOCUMENTS

| | | | |
|---|---|---|---|
| 3,138,506 A | 6/1964 | Ross | |
| 3,814,653 A | 6/1974 | Heier | |
| 4,305,770 A | 12/1981 | Stiles | |
| 4,814,690 A * | 3/1989 | Melcher et al. | 324/674 |
| 5,242,651 A | 9/1993 | Brayden et al. | |
| 6,620,357 B2 * | 9/2003 | Bruning et al. | 264/45.4 |
| 2005/0025929 A1 * | 2/2005 | Smith et al. | 428/73 |
| 2009/0155403 A1 * | 6/2009 | Busch et al. | 425/523 |

FOREIGN PATENT DOCUMENTS

| | | |
|---|---|---|
| DE | 3122235 | 5/1982 |
| EP | 0478033 | 4/1992 |
| EP | 1 258 343 A2 | 11/2002 |
| JP | 64-030752 U | 2/1989 |
| JP | 64-053822 | 4/1989 |

(Continued)

*Primary Examiner* — Katarzyna Wyrozebski Lee
*Assistant Examiner* — Joshel Rivera

(57) ABSTRACT

The invention relates to a method for the production of sandwich components with an open core structure and a cover layer applied to each side, wherein the cover layers are formed with a curable plastic material, and the sandwich component is cured in a closed device under pressure. A charging gas, which may be nitrogen or air, is introduced to the core structure prior to at least partial solidification of the cover layers, wherein a charging gas pressure $p_{Charging\ gas}$ is selected that is less than or equal to an operating pressure $p_{operating}$ of the closed device in order to, in particular, at least largely prevent the formation of sink marks in the cover layers. Furthermore, the invention relates to a press for implementing the method.

12 Claims, 1 Drawing Sheet

(56) References Cited

FOREIGN PATENT DOCUMENTS

| | | |
|---|---|---|
| JP | H03-502728 A | 6/1991 |
| JP | 06-000901 A | 1/1994 |
| JP | 06-344366 A | 12/1994 |
| JP | 07-308983 A | 11/1995 |
| JP | 2005-047180 A | 2/2005 |

* cited by examiner

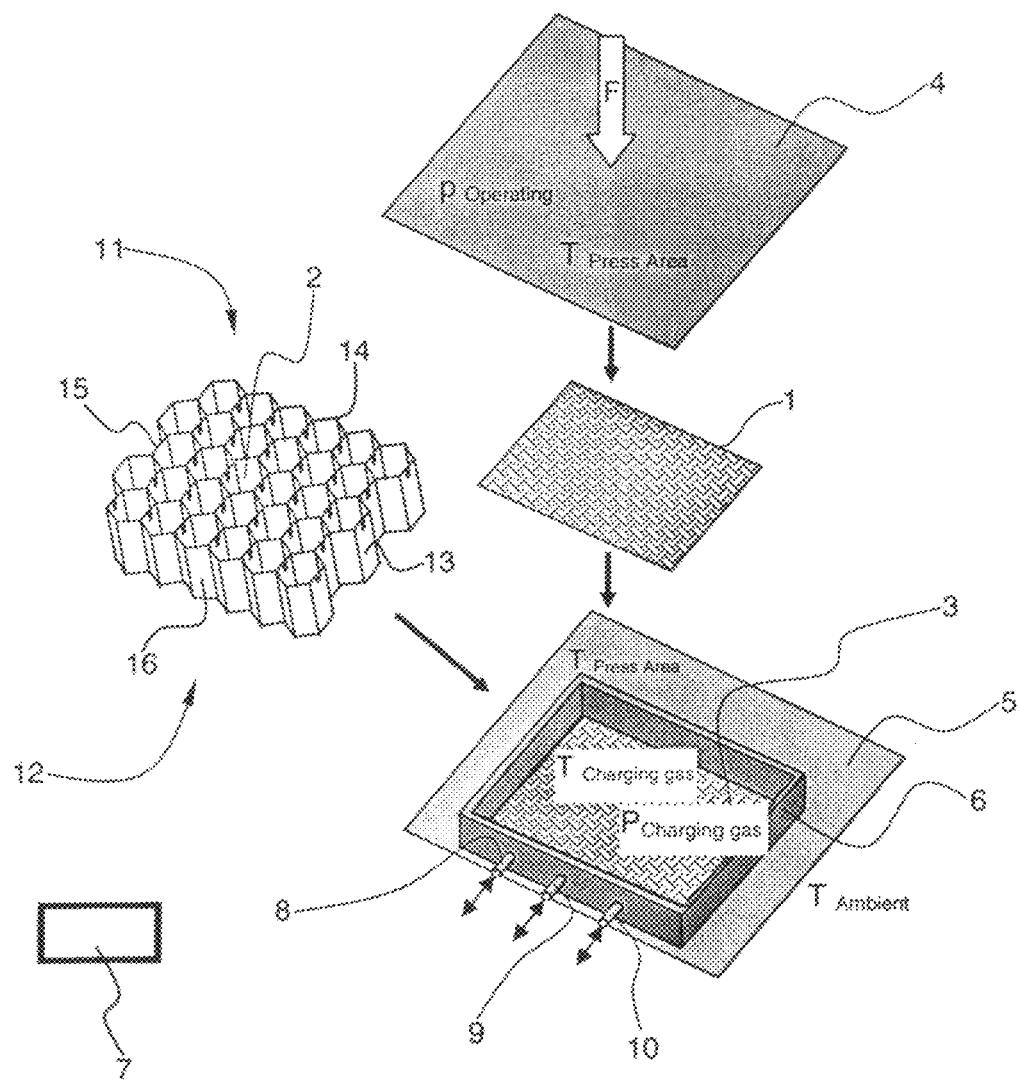

METHOD FOR PRODUCING SANDWICH COMPONENTS AND CORRESPONDING PRESS

The invention relates to a method for the production of sandwich components with an open core structure and a cover layer applied to each side, wherein the cover layers are formed with a curable plastic material, and the sandwich component is cured in a closed device under pressure.

Furthermore, the invention relates to a press for implementing the method according to the invention, with two press areas that are temperature-controllable by means of at least one heater, which press areas are surrounded by a frame so as to be sealed off, wherein a core structure as well as at least two cover layers that are formed with a curable plastic material can be put in place in the frame in order to form a sandwich component.

As a rule, sandwich components for application in the field of lightweight construction, in particular in aircraft construction, are formed with core structures to which a cover layer is applied to each side. Often the cover layers are made with a prefabricated so-called "prepreg" material. This prepreg material is a woven reinforcement fibre material, interlaid reinforcement fibre scrim, or comprises discrete reinforcement fibres that have been pre-impregnated at the factory with a curable plastic material, for example an epoxy resin, polyester resin, phenolic resin or a BMI resin. The prepreg material has a limited shelf life, even at low storage temperatures, and has to be processed within a short space of time. Often honeycomb structures or folded honeycomb structures comprising various geometric shapes are used.

In order to produce the finished sandwich component, for example a flat sandwich panel, the cover layers are preferably put in place on each side onto the core structure. Depending on rigidity requirements, the cover layers can comprise a multitude of layers, placed one on top of the other, with prepreg material. This structure is then cured for a precisely defined period of time in a suitable device, in particular in a press or in an autoclave, at elevated temperature and at elevated pressure, so as to form the finished sandwich component.

Due to the required curing temperature of, for example, 140° C., which is elevated when compared to the ambient temperature, the interior pressure in each cell of the core structure rises. At first the internal overpressure can escape from the cells because the curable plastic material contained in the cover layers changes its viscosity during the curing process. When the sandwich component cools down after completion of the curing process, slight negative pressure results in the individual cells of the core structure, which negative pressure leads to sink marks above each cell of the core structure. The behaviour described above is independent of the curable plastic material or resin system used.

In order to ensure an adequate surface quality of the finished sandwich components, in particular for the application as interior lining components for passenger cabins of aircraft, as a rule some elaborate reworking of the surfaces, for example by grinding and levelling out, is required. Furthermore, during the curing process plastic material or prepreg material can foam, at least in some areas, as a result of steam formation, so that in the region of the interior surfaces of the cover layers the mechanical connection between the cover layers and the core structure is impeded.

It is an object of the invention to state a method for producing sandwich components, which method makes it possible to produce sandwich components with optimal surfaces.

This object is firstly met by a method with the characterising features of claim 1.

By introducing a charging gas, in particular nitrogen or air, to the core structure prior to at least partial solidification of the cover layers, wherein a charging gas pressure is selected that is less than or equal to an operating pressure of the closed device in order to, in particular, at least largely prevent the formation of sink marks in the cover layers, it is possible to produce sandwich components with almost optimum surface characteristics, which, as a rule, render any mechanical reworking superfluous.

One embodiment of the method according to the invention provides for the charging gas pressure to be varied by a control- and regulating device as a function of the degree of solidification of the cover layers. In this way very precise control of the progress of the method according to the invention is possible, which control results in almost optimum surfaces, in particular without any sink marks or the like, of the sandwich components.

A further advantageous embodiment of the invention provides for the temperature of the charging gas to be lowered in order to reduce the dwell time of the sandwich component in the device. This makes it possible to accelerate the entire production method because the cooling-down times of the cured sandwich components are shortened.

According to a further embodiment of the invention, a press or an autoclave is used for curing the sandwich component. In order to implement the method according to the invention, at first at least one cover layer, and subsequently a necessarily open core structure as well as at least one further cover layer, are placed into the press and are cured at elevated pressure and at elevated temperature, wherein the core structure is flooded with a charging gas. In this process the charging gas pressure must not exceed the operating pressure of the press so as to achieve adequate adaptation of the cover layers to the core structure and thus adequately strong bonding of the cover layers to the core structure during the curing process. In an alternative procedure the curing of the sandwich component can also take place in an autoclave. In this process the interior pressure of the autoclave must again be selected so that it exceeds the charging gas pressure.

A further advantageous embodiment of the method according to the invention provides for the degree of solidification of the cover layers, in particular a viscosity state of the cover layers, to be acquired by the control- and regulating device, and for the charging gas pressure to be varied accordingly.

In this way the formation of sink marks in the cover layers, which sink marks arise during the cooling process in the cells of the core structure and which would otherwise necessitate elaborate mechanical reworking, can be almost completely suppressed by increasing the charging gas pressure. In this method, direct measuring of the degree of solidification of the cover layers makes it possible to more closely control the filling gas pressure in the core structure of the sandwich component, which filling gas pressure is necessary to avoid sink marks, when compared to indirect determination of the respective degree of solidification by means of empirically determined curing curves, which are, for example, time-dependent and/or temperature-dependent, of the prepreg material used or of the resin system used in each case.

According to a further advantageous embodiment, the viscosity state of at least one cover layer is determined by the control- and regulating device by a change in the relative permittivity. During the curing process of the cover layers formed with the use of a curable plastic material, for example an epoxy resin, a polyester resin, a phenolic resin, a BMI resin or the like, the relative permittivity of the cover layers changes, which relative permittivity is in a simple manner acquirable by the control- and regulating device, for example by means of sensors that are suitably arranged in the closed device, for example in a press or the like.

According to a further advantageous embodiment of the method, in order to form an integral border seal for the sandwich component, at least one border section, which protrudes beyond the core structure, of at least one cover layer prior to the curing process in the closed device is at least in some sections placed against at least one edge of the core structure and/or against the other cover layer. In order to form the integral border seal it is necessary for at least one cover layer to comprise a larger area than the top or the bottom of the core structure. In order to form the integral border seal, the projecting border sections are placed at least against the edges of the core structure. To this effect the border sections have to be "canted off" by 90°. If the width of the border sections is sufficient, then said border sections can be placed against both the edges of the core structure and against the top of the other cover layer so that a very good bond between the integral border seal and the core structure and the cover layers results. The structure formed in this manner, comprising the core structure as well as the correspondingly "canted-off" cover layers, is for example placed in a frame of a suitable press device. In this arrangement the frame must precisely match the resulting size of the sandwich component so that on the one hand during the supply of charging gas no bulging of the cover layers placed around the edges of the core structure occurs. On the other hand, the frame must not be too small because the additional material thickness of the border regions placed against the edges of the core structure of at least one cover layer must be adequately taken into account so that the sandwich component to be cured can be placed into the frame. If all four sides of the sandwich component are enclosed by the prepreg material of the cover layers, it becomes necessary for the connection devices or inlet- and outlet air connection pieces for the charging gas to penetrate, at least on one side, the cover layers placed around the edges of the core structure.

Further advantageous embodiments of the method are contained in further claims.

Moreover, the object according to the invention is met by a press for implementing the method according to claim 8.

Because the frame comprises at least one connection device for letting in and/or out a charging gas to/from the core structure in order to, during the curing process of the sandwich component, in particular at least in part prevent sink marks in the cover layers from occurring, sandwich components of good surface quality, which in particular do not require any mechanical reworking by means of grinding, levelling out or the like, can be produced in a simple manner.

An advantageous design of the press provides for the operating pressure of the press and/or the charging gas pressure to be variable by means of a control- and regulating device.

This makes possible precise control of the charging gas pressure so that in particular the formation of sink marks in the cover layers during the curing process can be prevented to a very large extent.

According to a further advantageous embodiment of the press, the temperature of at least one press area is variable by means of the control- and regulating device. This embodiment makes it possible to precisely and above all reliably reproduce the curing process so that identical mechanical characteristics of the sandwich components produced are always ensured.

A further advantageous embodiment provides for the temperature of the charging gas to be variable by means of the control- and regulating device. In this way the duration of the entire production process can be shortened in that, for cooling purposes, the temperature of the charging gas is lowered towards the end of the curing process so that the finished cured sandwich components can be removed earlier from the press.

According to a further advantageous embodiment of the press according to the invention, the degree of curing of the cover layers, in particular the state of viscosity of the cover layers, can be acquired by means of the control- and regulating device. Direct measuring of the viscosity state makes possible more precise control of the curing process when compared to indirect determination of the degree of curing of the cover layers by means of empirically determined time-dependent and/or temperature-dependent curing curves (characteristic viscosity diagrams) or the like.

Further advantageous embodiments of the press according to the invention are disclosed in the following claims.

The drawing shows the following:

FIG. 1 a schematic diagram of the press for implementing the method according to the invention.

With reference to FIG. 1, both the method according to the invention and the press used to implement the method are to be explained.

FIG. 1 is a perspective view of a press for implementing the method with subcomponents of a sandwich component to be produced.

In the exemplary embodiment shown, a sandwich component comprises a cover layer 1, a core structure 2 and a further cover layer 3. The cover layers 1, 3 comprise prepreg material. The so-called prepreg material can be woven reinforcement fibre material, interlaid reinforcement fibre scrim or discrete reinforcement fibres, which have been pre-impregnated with a curable plastic material. In particular, carbon fibres, glass fibres, aramide fibres or the like can be used as reinforcement fibres. In particular, epoxy resins, polyester resins, BMI resins or the like are used as a curable plastic material for prepreg materials. With a supply of heat the prepreg materials can be cured. In the exemplary embodiment shown, the core structure 2 is a slotted honeycomb core. Instead of a slotted honeycomb core, any desired open three-dimensional, i.e. in particular drainable, core structures can be used, for example with resin-stabilised knitted fabrics, resin-stabilised woven fabrics, perforated core structures, open-pore plastic foams, folded honeycomb cores, formed spacers for woven materials (for example in the form of egg cartons) or the like.

A press used in the manufacture of the sandwich component among other things comprises a top press area 4, a bottom press area 5 and a frame 6 which in a pressure-proof manner encloses the sandwich component to be made. For the production of one-dimensional or two-dimensional curved sandwich components, the press areas 4, 5 can comprise a geometric shape that differs from the shown plane shape, for example they can be spherically curved. The press areas 4, 5 and the frame 6 comprise a heater device (not shown). By means of a drive device (not shown), for example a hydraulic cylinder or the like, at least the upper press area 4 can be lowered at a defined mechanical force F onto the lower press area 5. Due to the mechanical force F that acts on the top press area 4, an operating pressure $p_{Operating}$ arises in the press. The operating pressure $p_{Operating}$ is up to 15 bar.

By means of a control- and regulating device 7 at least the mechanical force F acting on the top press area 4, as well as the heater for temperature-controlling the top and bottom press areas 4, 5, can be controlled or regulated. Outside the press there is the normal ambient air pressure $p_{Ambient}$ as well as the normal ambient temperature $T_{Ambient}$.

In order to carry out the method according to the invention, the construct, comprising the cover layers 1, 3 as well as the core structure 2, for forming the finished sandwich element is placed into the frame 6. Subsequently, at least the top press area 4 is pressed with the force F downwards against the bottom press area 5 so that the cover layers 1, 3 are firmly pressed onto the core structure 2. In this way a mechanically very load-capable connection between the core structure 2 and the cover layers 1, 3 results. In this way, by means of the heating device, the temperature $T_{Press}$ area of the press areas 4, 5 is set such that the prepreg material used to form the cover layers 1, 3 cures at a curing temperature that is optimal for the respective prepreg material or resin system.

In the exemplary embodiment shown the frame 6 of the press comprises three connection devices 8 to 10, through which a charging gas can be let into or out of the core structure 2 at a determined charging gas pressure $p_{Charging\ gas}$. Controlling the charging gas pressure $p_{Charging\ gas}$ can take place by means of suitable control valves that can be controlled by means of the control- and regulating device, which control valves influence the inflow from a pressure gas storage device. In order to be able to lower the pressure in the core structure 2 in a defined manner, it may be necessary to also provide a gas conveying device, for example a pump or the like. Controlling the inflow and outflow of the charging gas through the connection devices 8 to 10, in particular controlling the charging gas pressure $p_{Charging\ gas}$ as well as controlling the supplied and removed quantity of charging gas, is controlled by the control- and regulating device 7 by means of control valves (not shown). The frame 6 seals the press areas 4, 5 in a largely pressure-proof manner by means of sealing elements (not shown) even during movement of the press areas 4, 5 during the press procedure, so that in the core structure 2 a charging gas pressure $p_{Charging\ gas}$ is achievable that is elevated when compared to the ambient air pressure $p_{Ambient}$. The three connection devices 8 to 10 make it possible to quickly set a predetermined charging gas pressure in the core structure 2. Some other number of connecting devices also allows adequate functioning of the arrangement.

For example air, nitrogen or some other chemically inert gas can be used as a charging gas. In order to implement the method according to the invention the control- and regulating device 7 permanently acquires the degree of solidification or the viscosity state of the cover layers 1, 3 during the process of curing the sandwich component.

Acquiring the degree of solidification can, for example, be implemented by measuring the change in the relative permittivity of the plastic material used to form the cover layers 1, 3 or of the prepreg material during the curing process. To this effect suitable electrical sensors are to be arranged in the region of the press areas 4, 5 or of the cover layers 1, 3.

As an alternative, it is also possible to empirically determine time-dependent, temperature-dependent, as well as pressure-dependent curing curves of the respective prepreg material. These curing curves are then deposited in the control- and regulating device 7. By measuring the duration of time of the curing process the control- and regulating device 7 can then for example, in each instance as a function of the temperature of the press areas 4, 5, which temperature has been determined by means of the heater, determine the degree of solidification at the time, or the viscosity state at the time, of the cover layers 1, 3.

From the degree of solidification at the time or the respective viscosity state, determined in this way, of the cover layers 1, 3, the required charging gas pressure $p_{Charging\ gas}$ is then determined in order to reliably prevent sink marks from occurring within the cover layers 1, 3 during the curing process. In this procedure it must be taken into account that the mechanical loadability of the adhesive connection between the cover layers 1, 3 and the core structure 2 increases as the curing process progresses with an increased degree of curing of the cover layers 1, 3, so that the charging gas pressure $p_{Charging\ gas}$ can gradually be increased as a function of the increasing degree of curing of the cover layers 1, 3.

The charging gas pressure $p_{Charging\ gas}$, which the press exerts on the cover layers 1, 3 or on the core structure 2, due to the press force F, is preferably selected so as not to exceed an operating pressure $p_{Operating}$ of the press so as to achieve a still adequate contact pressure of the cover layers 1, 3 onto the core structure 2. This operating pressure $p_{Operating}$ or contact pressure is required to generate an adhesive connection between the cover layers 1, 3 and the core structure 2, which adhesive connection provides sufficient mechanical loadability, and is thus mandatory for the achievable overall strength of the sandwich component to be produced.

By correspondingly controlling the charging gas pressure $p_{Charging\ gas}$ as a function of the progress of the curing process and thus of the increasing degree of solidification of the cover layers 1, 3 by means of the control- and regulating device 7, it is possible to produce a sandwich component with almost optimal surface quality, in other words in particular without any sink marks or the like. Expensive mechanical reworking of the surfaces of the sandwich components, which reworking has been necessary up to now, in particular for the use as interior lining components in passenger cabins of aircraft, by means of grinding, levelling out or the like, can thus be done without.

In order to provide the sandwich component to be produced with a border seal from the start, it is possible, for example, for the cover layer 1 to comprise a larger area than that of the top 11 or the bottom 12 of the core structure 2. The excess cover layer material is then placed over the edges 13 to 16 of the core structure 2 and during the curing process is connected to the edges 13 to 16 to form the border seal. Furthermore, it is possible, starting from the top 11, to draw the excess cover layer material around the edges 13 to 16 right to the underside 12 of the core structure 2. Integral production of a border seal requires a correspondingly precisely-fitting frame 6, wherein the material thickness of the material used for forming the cover layers 1, 3 has to be taken into account. By means of this approach according to the invention, it is possible to do without subsequent production of a border seal, for example by applying a sealing material with a spatula or some other application tool.

This approach requires that in the exemplary embodiment shown the connection devices 8 to 10 in their function as inlet- and outlet air connection pieces for the charging gas penetrate at least the cover layer material placed against the edge 16 of the core structure 2. After curing, these leadthroughs, whose position in particular during the production of interior lining components is preferably selected such that during final installation they are not visible, must be closed with corresponding materials so as to prevent any ingress of moisture and/or extraneous particles.

Furthermore, if necessary, the temperature of the charging gas, $T_{Charging\ gas}$ can be lowered in a targeted manner by means of a temperature-control device, in particular a combined heating and cooling device, so as to, in this case by cooling the sandwich component, ensure the ability to remove said sandwich component sooner from the press, and so as to ensure, in particular, a shortening of the production process.

Depending on the resin system used, the temperature of the press areas 4, 5 is, for example, 140° C. so as to ensure an adequately quick curing process. The charging gas pressure $p_{Charging\ gas}$ is preferably less than 6 bar so as to achieve a mechanically still adequately strong connection of the cover layers 1, 3 to the core structure 2.

As an alternative, curing of the sandwich component can also take place in an autoclave.

According to the invention, a charging gas, in particular nitrogen or air, is introduced to the core structure 2 prior to at least partial solidification of the cover layers 1, 3, wherein a charging gas pressure $p_{Charging\ gas}$ is selected that is less than or equal to an operating pressure $p_{operating}$ of the closed device in order to, in particular, at least largely prevent the formation of sink marks in the cover layers 1, 3.

By a corresponding control of the charging gas pressure $p_{Charging\ gas}$ of the charging gas in the core structure 2 during the curing process of the sandwich component, it is possible to produce sandwich components with almost optimum surface characteristics, in particular without the formation of sink marks in the cover layers 1, 3 of the core structure 2, which sink marks often form as a result of a negative-pressure build-up, due to cooling, in the cells of the core structure 2, so that hitherto required expensive mechanical reworking of the sandwich component, for example by grinding or levelling out, is superfluous.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

List of Reference Characters
1 Cover layer
2 Core structure
3 Cover layer
4 Press area (top)
5 Press area (bottom)
6 Frame
7 Control- and regulating device
8 Connection device
9 Connection device
10 Connection device
11 Top (core structure)
12 Underside (core structure)
13 Edge
14 Edge
15 Edge
16 Edge

The invention claimed is:

1. A method for the production of sandwich components with an open core structure and a cover layer applied to both sides, wherein the cover layers are formed with a curable plastic material, and the sandwich component is cured in a press under pressure, the method comprising:
    pressurising the core structure and the cover layer with first and second press areas of the press to create a sandwich component;
    temperature-controlling the first and second press areas with a heater;
    introducing a charging gas to the core structure prior to at least partial solidification of the cover layers with at least first and second connection devices of a frame of the press;
    selecting a charging gas pressure that is less than an operating pressure of the press to substantially prevent the formation of sink marks in the cover layers;
    acquiring a degree of solidification of the cover layers by a control- and regulating device;
    varying the charging gas pressure by the control- and regulating device as a function of the degree of solidification of the cover layers, so that the charging gas pressure is gradually increased as a function of the increased degree of solidification of the cover layers.

2. The method of claim 1 further comprising:
    lowering the temperature of the charging gas to reduce the dwell time of the sandwich component in the device.

3. The method of claim 1, wherein the degree of solidification in the form of a viscosity state of at least one of the first and second cover layers is determined by the control- and regulating device by a change in the relative permittivity.

4. The method of claim 1, further comprising the step of:
    placing at least a section of at least one border section of at least one cover layer, prior to the curing process, against at least one edge of the core structure and/or against the other cover layer.

5. A press for implementing the method of claim 1, comprising:
    first and second press areas with at least one heater for temperature-controlling the press areas;
    a frame for sealing surrounding the press areas,
    a control- and regulating device;
    wherein the frame is adapted to enclose a core structure as well as at least first and second cover layers formed with the use of a curable plastic material;
    wherein the two press areas are adapted to pressurise the core structure and the first and second cover layers to create a sandwich component;
    wherein the frame comprises at least first and second connection devices for letting in and/or out a charging gas to/from the core structure to, at least in part, prevent sink marks in the cover layers from occurring, during a curing process of the sandwich component;
    wherein the control- and regulating device is adapted to acquire a degree of solidification of the cover layers;
    wherein the control- and regulating device is adapted to select a charging gas pressure that is less than an operating pressure of the press and to vary the charging gas pressure, as a function of the degree of solidification of the cover layers so that the charging gas pressure is gradually increased as a function of the increased degree of solidification of the cover layers.

6. The press of claim 5, wherein an operating pressure ($p_{operating}$) of the press is variable by means of the control- and regulating device.

7. The press of claim 5, wherein a temperature ($T_{Press\ area}$) of at least one press area is variable by means of the control- and regulating device.

8. The press of claim 5, wherein a temperature ($T_{Charging\ gas}$) of the charging gas is variable by means of the control- and regulating device.

9. The press of claim 5, wherein the control- and regulating device is adapted to acquire as a degree of curing of the cover layers a state of viscosity of the cover layers.

10. The press of claim 5, wherein the control- and regulating device is adapted to acquire a viscosity state during the curing process of the cover layers by measuring the relative permittivity.

11. The press of claim 5, wherein the progress of the curing process is controllable by a control- and regulating device.

12. The method of claim 1, wherein the charging gas comprises at least one of air and nitrogen.

* * * * *